United States Patent
Gupta et al.

(10) Patent No.: US 8,611,470 B2
(45) Date of Patent: Dec. 17, 2013

(54) IDENTIFYING ROGUE GSM BASE STATIONS BY INTERCEPTING DOWNLINK BEACON CHANNELS

(75) Inventors: Utkarsh Gupta, Mumbai (IN); Sartaj Chaudhary, Mumbai (IN); Baijayanta Ray, Bangalore (IN)

(73) Assignee: National Instruments Corporation, Austin, TX (US)

( * ) Notice: Subject to any disclaimer, the term of this patent is extended or adjusted under 35 U.S.C. 154(b) by 251 days.

(21) Appl. No.: 13/040,880

(22) Filed: Mar. 4, 2011

(65) Prior Publication Data

US 2012/0027064 A1 Feb. 2, 2012

(30) Foreign Application Priority Data

Jul. 30, 2010 (IN) .......................... 1794/DEL/2010

(51) Int. Cl.
*H04L 27/00* (2006.01)

(52) U.S. Cl.
USPC ........... 375/326; 370/337; 370/347; 375/224; 375/316

(58) Field of Classification Search
None
See application file for complete search history.

(56) References Cited

U.S. PATENT DOCUMENTS 6,408,019 B1 * 6/2002 Pickering et al. ............. 375/130
7,620,125 B1 * 11/2009 Chang et al. .................. 375/326

OTHER PUBLICATIONS

3rd Generation Partnership Project; Technical Specification Group GSM/EDGE Radio Access Network; Multiplexing and multiple access on the radio path (Release 9); 3GPP TS 45.002 V9.3.0 (Mar. 2010), Global System for Mobile Communication, 2010, 112 pages.
Minimum-shift keying, Wikipedia, the free encyclopedia; http://en.wikipedia.org/wiki/Minimum-shift_keying, 2 pages. [Retrieved Oct. 11, 2011].
Phase-shift keying, Wikipedia, the free encyclopedia; http://en.wikipedia.org/wiki/Phase-shift_keying, 16 pages. [Retrieved Oct. 11, 2011].

* cited by examiner

*Primary Examiner* — Leon-Viet Nguyen
(74) *Attorney, Agent, or Firm* — Meyertons Hood Kivlin Kowert & Goetzel, P.C.; Jeffrey C. Hood; Mark K. Brightwell

(57) ABSTRACT

System and methods and memory media for identifying a rogue base station. A receiver captures an input signal that includes a mixture of the rogue station's transmission and the transmission of a victim base station. The victim station's transmission is removed from the mixture. A plurality of channel signals are extracted from the residual signal. The channel signals are analyzed which of them are "valid", i.e., contain a GMSK-modulated GSM signal. The "valid" channel signals are low pass filtered and then analyzed to determine which of them corresponds to the beacon channel. Information identifying the rogue base station is extracted from the beacon channel.

20 Claims, 7 Drawing Sheets

IDENTIFYING ROGUE GSM BASE STATIONS BY INTERCEPTING DOWNLINK BEACON CHANNELS

RELATED APPLICATION DATA

This application claims the benefit of priority under 35 U.S.C. 119 to Indian Provisional Application No. 1794/DEL/2010, filed with the Patent Office of India on Jul. 30, 2010, titled "Various Receiver Systems and Methods", and invented by Baijayanta Ray, Nikhil Ashok Deshmukh, Pratik Prabhanjan Brahma, Ankit Sethi, Kunal Agarwal, Sartaj Chaudhury, and Utkarsh Gupta. That Provisional Application is hereby incorporated by reference in its entirety as though fully and completely set forth herein.

FIELD OF THE INVENTION

The present invention relates to the field of telecommunication, and more specifically, to systems and methods for identifying rogue GSM base stations by intercepting their downlink beacon channels

DESCRIPTION OF THE RELATED ART

GSM is a widely used standard for wireless communication. A base station transmits to mobile units via a number of downlink channels, each channel occupying a different range of frequencies. One of the downlink channels is a so-called "beacon channel" that includes information that identifies the base station, e.g., information such as a base station color code and a network color code.

In some situations, a base station's transmissions may be interfered upon by the transmissions of a rogue base station. (A rogue base station is a station that is transmitting outside the authority of a regulatory agency.) For example, the rogue station may be transmitting over channels that overlap with the channels of the first base station. Thus, mobile units in the vicinity of the first base station may have great difficulty demodulating and decoding the transmissions of the first base station. Therefore, there exists a need for mechanisms capable of identifying the rogue base station, e.g., receiver-based mechanisms capable of passively identifying the rogue base station based on signals received while both the rogue based station and first base station are simultaneously transmitting.

SUMMARY

A method according to at least one embodiment of the present invention may involve the following operations.

The method may involve operating on a signal $\{x(n)\}$ to generate a plurality of baseband signals based on a corresponding plurality of overlapping frequency bands, where each of the baseband signals is generated by frequency-translating the signal $\{x(n)\}$ based on a center frequency of the corresponding frequency band and by low-pass filtering the frequency-translated signal.

The method may also involve identifying which one or more of the overlapping frequency bands are spectrally occupied.

The method may also involve analyzing the baseband signal corresponding to each of the one or more spectrally-occupied frequency bands in order to classify the spectrally-occupied frequency band as not containing a GSM signal, as containing a GMSK-modulated GSM signal, or as containing a PSK-modulated GSM signal.

The method may also involve estimating a respective value of carrier frequency offset for each of the one or more spectrally-occupied frequency bands that have been classified as containing a GMSK-modulated GSM signal. The action of estimating the respective value of the carrier frequency offset for each spectrally-occupied frequency band is based on the corresponding baseband signal.

The method may also involve applying a frequency correction to each of the one or more baseband signals that correspond to the one or more spectrally-occupied frequency bands that have been classified as containing a GMSK-modulated GSM signal, based on the corresponding respective estimated value of carrier frequency offset.

The method may also involve identifying one of the one or more frequency corrected signals as corresponding to a GSM beacon channel by determining which of the one or more frequency corrected signals includes a known extended training sequence and a known frequency correction burst.

In some embodiments, the method may also include computing the signal $\{x(n)\}$, where the action of computing the signal $\{x(n)\}$ includes: receiving an input signal that includes a mixture of the first signal transmitted by the rogue base station and a second signal from a victim base station; and removing the second signal from the input signal to obtain the signal $\{x(n)\}$.

In some embodiments, the method may also include extracting information regarding the rogue base station from the frequency corrected signal that corresponds to the GSM beacon channel. The extracted information may include a base station color code and a network color code of the rogue base station. The extracted information may be displayed to a user via a display device and/or stored in a memory for later viewing and/or processing.

In some embodiments, the action of extracting the information may include: extracting a synchronization burst from the frequency corrected signal that corresponds to the GSM beacon channel; and performing equalization, demodulation and decoding on the synchronization burst.

BRIEF DESCRIPTION OF THE DRAWINGS

A better understanding of the present invention can be obtained when the following detailed description of the preferred embodiments is considered in conjunction with the following drawings.

Figure 1A:
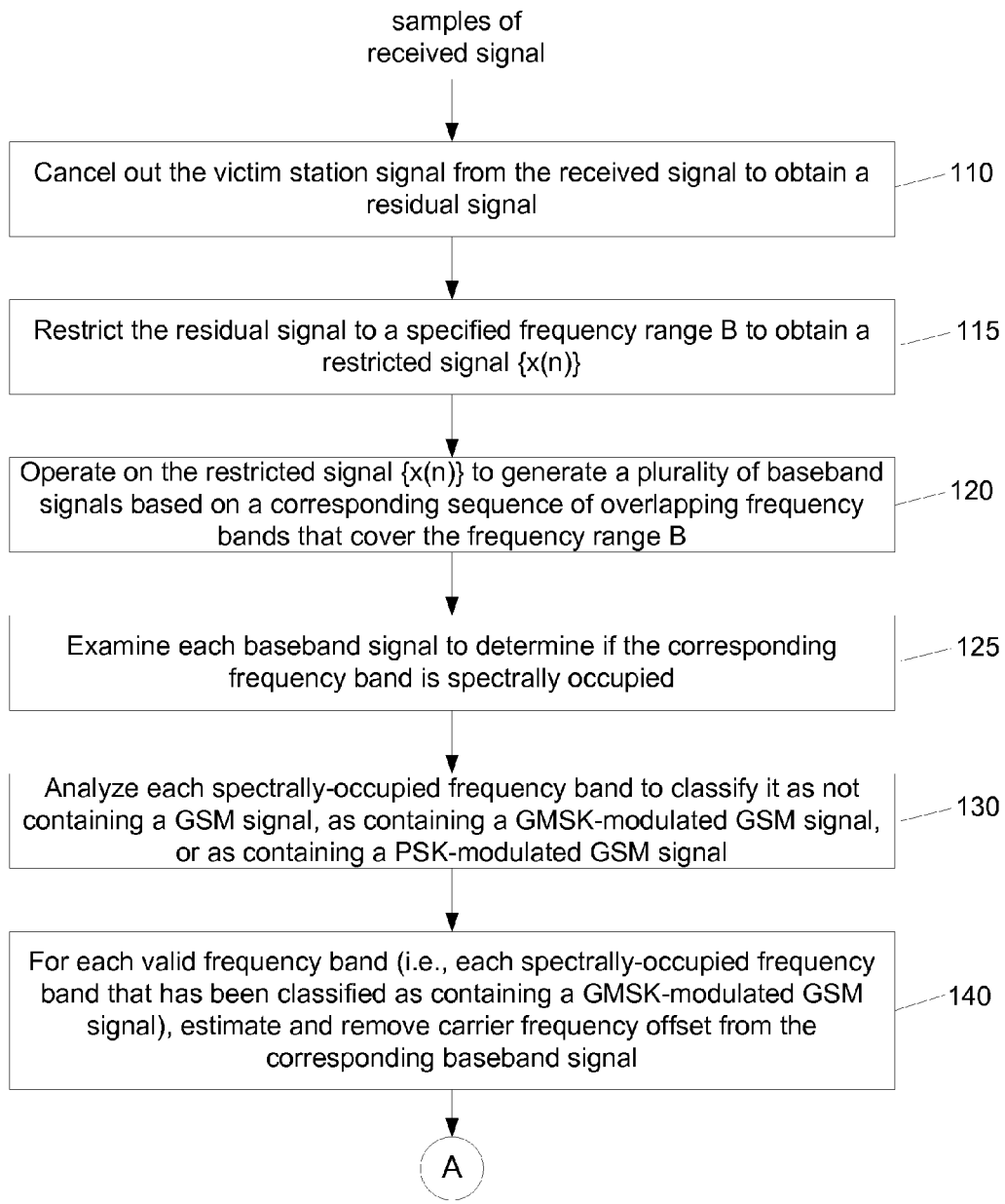
FIGS. 1A and 1B illustrate an embodiment of a method for identifying a rogue GSM base station by intercepting its downlink beacon channel.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

The following is a glossary of terms used in the present document.

Memory Medium—A memory medium is a medium configured for the storage and retrieval of information. Examples of memory media include: various kinds of semiconductor memory such as RAM and ROM; various kinds of magnetic media such as magnetic disk, tape, strip and film; various kinds of optical media such as CD-ROM and DVD-ROM; various media based on the storage of electrical charge and/or other physical quantities; media fabricated using various lithographic techniques; etc. The term "memory medium" may also include a set of two or more memory media which reside at different locations, e.g., at different computers that are connected over a network.

Programmable Hardware Element—a hardware device that includes multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. As used herein, the term "program" includes within its scope of meaning: 1) a software program which is stored in a memory and is executable by a processor, or, 2) a hardware configuration program useable for configuring a programmable hardware element. Any of the method embodiments described herein, or, any combination of the method embodiments described herein, or, any subset of any of the method embodiments described herein, or, any combination of such subsets may be implemented in terms of one or more programs.

Software Program—the term "software program" is intended to have the full breadth of its ordinary meaning, and includes any type of program instructions, code, script and/or data, or combinations thereof, that may be stored in a memory medium and executed by a processor or computer system. Exemplary software programs include: programs written' in text-based programming languages such as C, C++, Java™, Pascal, Fortran, Perl, etc.; graphical programs (programs written in graphical programming languages); assembly language programs; programs that have been compiled to machine language; scripts; and other types of executable software. A software program may comprise two or more subprograms that interoperate in a specified manner.

Hardware Configuration Program—a program, e.g., a netlist or bit file, that can be used to program or configure a programmable hardware element.

Graphical Program—A program comprising a plurality of interconnected nodes or icons, where the plurality of interconnected nodes or icons visually indicate the functionality of the program. A graphical program is a type of diagram.

The following provides examples of various aspects of graphical programs. The following examples and discussion are not intended to limit the above definition of graphical program, but rather provide examples of what the term "graphical program" encompasses.

The nodes in a graphical program may be connected in one or more of a data flow, control flow, and/or, execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, where the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as a receiver (e.g., an RF receiver), a signal processing board, a modem, a network interface (e.g., a wireless network interface), a unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, where the connections between the nodes indicate that data produced by one node is used by another node.

Node—In the context, of a graphical program, an element that may be included in a graphical program. A node may have an associated icon that represents the node in the graphical program, as well as underlying code and/or data that implements functionality of the node. Exemplary nodes include function nodes, sub-program nodes (sub-VIs), terminal nodes, structure nodes, etc. Nodes may be connected together in a graphical program by connection icons or wires.

Graphical User Interface—this term is intended to have the full breadth of its ordinary meaning. The term "Graphical User Interface" is often abbreviated to "GUI". A GUI may include one or more input GUI elements, one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses.

A GUI may comprise a single window having one or more GUI Elements, or may comprise more than one window, each having one or more GUI Elements.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and that enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input, and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, switches, text input boxes, numeric input fields, etc.

Output Indicator—a graphical user interface element for displaying output from a program. Exemplary output indicators include charts, graphs, gauges, text output boxes, numeric displays, etc. An output indicator is sometimes referred to as an "output control".

Computer System—any of various types of computing or processing systems, including a personal computer (PC), a mainframe computer system, a workstation, a laptop, a network appliance, an Internet appliance, a hand-held or mobile device, a personal digital assistant (PDA), a television system, a grid computing system, or other device or combinations of devices. In general, the term "computer system" can be broadly defined to encompass any device (or combination of devices) having at least one processor that is configured to execute instructions that are stored on a memory medium.

Measurement Device—includes instruments, data acquisition devices, smart sensors and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card, a video capture board, a smart camera, a motion control device, a robot having machine vision, and other similar types of devices. Exemplary "stand-alone" instruments include oscilloscopes, multimeters, signal analyzers, signal demodulators, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, e.g., may receive and analyze data, and issue automation control signals in response.

Embodiments of the present invention may be realized in any of various forms. For example, any of the embodiments of the present invention may be realized as a computer-implemented method, a computer-readable memory medium, or a computer system. Furthermore, any of the embodiments of the present invention may be realized using one or more custom-designed hardware devices such as ASICs and/or using one or more programmable hardware elements such as FPGAs.

A computer-readable memory medium is a memory medium that stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium. The memory medium stores program instructions. The processor is configured to read and execute the program instructions from the memory medium. The program instructions are executable by the processor to implement a method, e.g., any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

In some embodiments, a set of computers distributed across a network may be configured to partition the effort of executing a computational method (e.g., any of the method embodiments disclosed herein).

The following is a list of acronyms used herein.
3GPP Third Generation Partnership Project
BCC Base station Color Code
CFO Carrier Frequency Offset
DFT Discrete Fourier Transform
EDGE Enhanced Data Rates for GSM Evolution
ETS Extended Training Sequence
FCCH Frequency Control Channel
FCB Frequency Correction Burst
FDMA Frequency Division Multiple Access
FFT Fast Fourier Transform
GMSK Gaussian Minimum Shift Keying
GSM Group System for Mobile Communications
LPF Low Pass Filter
NCC Network Color Code
P-GSM Primary GSM Spectrum
PSK Phase Shift Keying
8PSK PSK with Constellation Order 8
SCH Synchronization Channel TDMA Time-Division Multiple Access
TSC Training Sequence Identifying Rogue GSM Base Stations by Intercepting Downlink Beacon Channels A rogue GSM base station is a base station whose transmissions interfere with the transmissions of one or more other base stations. For example, in some situations, a rogue GSM base station is one that has not been authorized by the spectrum regulatory agency of a government and that may or may not be adhering to the timeslot synchronization or spectrum allocation requirements as set by the GSM standards. This patent describes, among other things, various embodiments of a receiver (e.g., a passive receiver) that identifies a rogue GSM base station, e.g., determines its base station ID and/or network ID. The receiver may identify a rogue GSM base station by identifying, intercepting, demodulating and decoding its beacon channel. (As used herein, the term "passive" may be interpreted as meaning "silent". In other words, a passive receiver is one that listens to GSM transmissions but does not generate its own GSM transmissions. So the passive receiver will not itself interfere with the operation of any base station.) Some embodiments of the receiver may rely on one or more of the following properties of GSM transmission.

1. GSM is a TDMA system with information being transmitted in constant-length time slots (or time packets). Each time slot includes 148 bits plus an idle period of 8.25 bit periods. Each bit period is approximately 3.69 microseconds.

2. Every TDMA time slot of GSM has a well-defined structure including a data preamble, a training sequence and a data post-amble. The slots are classified into two broad categories, namely, signaling channels and traffic channels.

3. The modulation scheme used for modulating the bit stream is either Gaussian MSK (for voice traffic) or 8-PSK (in EDGE).

4. The bandwidth used by each GSM channel is 200 KHz. Furthermore, the center frequencies of adjacent channels are separated by 200 KHz.

In some embodiments, one or more of the following assumptions are made.

1. The rogue base station is not transmitting in adjacent channels. Thus, the minimum distance between the center frequencies of any two rogue transmission channels may be at least 400 KHz.

2. In the vicinity of the victim base station (i.e., the authorized base station whose spectrum is being interfered upon), there is only one rogue base station.

3. The receiver has a mechanism of synchronizing to the victim base station so that the signal from the victim base station can be cancelled out of the received signal before attempting any identification of the rogue base station.

Figure 1B:
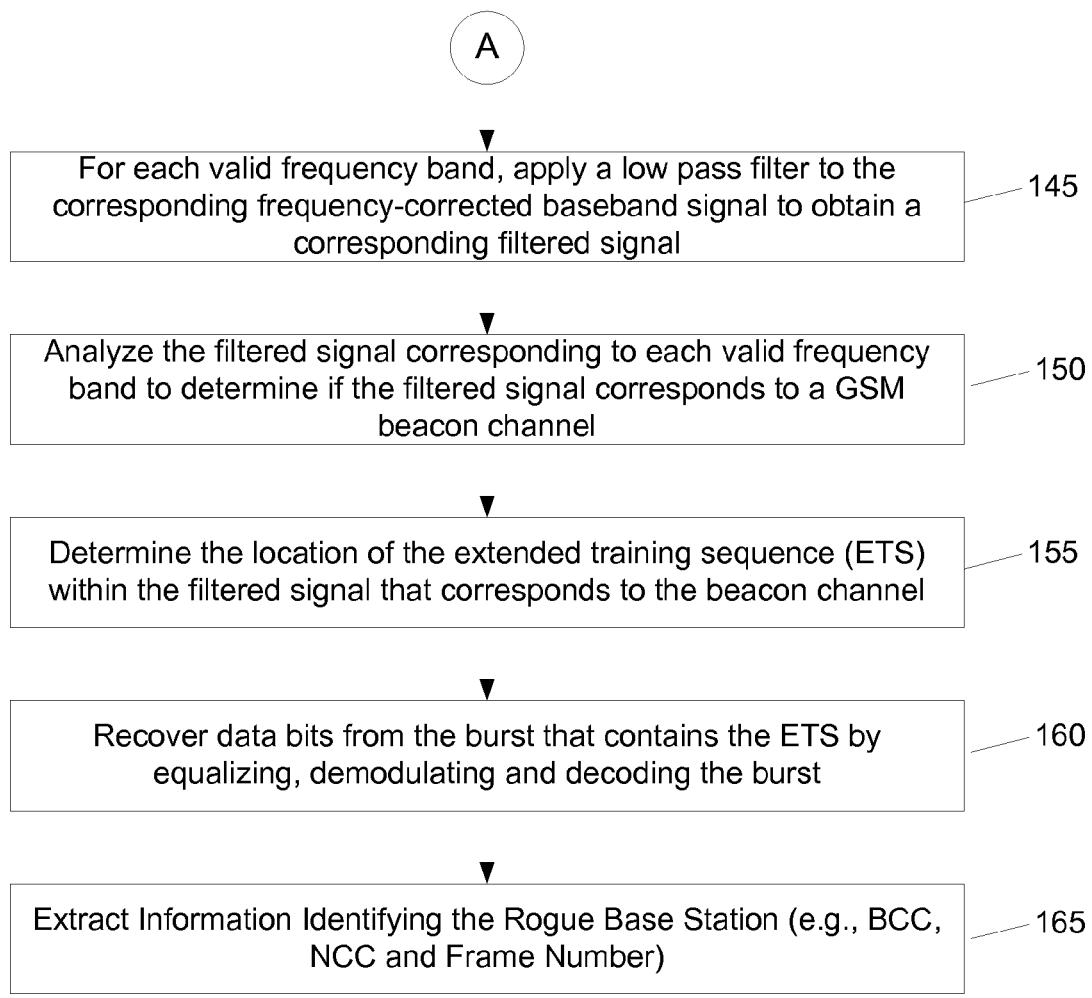

In one set of embodiments, a method for identifying a rogue GSM base station may involve the processing operations shown in FIGS. 1A and 1B. The method may be performed by a receiver system, e.g., a GSM interceptor system. The receiver system captures samples of a received signal. The received signal is a mixture of a signal from the rogue base station and a signal from the victim base station.

At 110, the signal from the victim base station is canceled out of the received signal to obtain a residual signal. The residual signal is an estimate of the signal from the rogue base station.

At 115, the residual signal (or equivalently, its Fourier spectrum) may be restricted to a frequency range B to obtain a restricted signal $\{x(n)\}$ (or a restricted spectrum $X(k)$, where k is a frequency index). The frequency range B may contain one or more or all of the GSM channels over which the victim base station is transmitting. The frequency range B may be configured so that any rogue GSM channel whose center frequency is outside the frequency range B could not possibly overlap with any of the victim's GSM channels. For example, if the victim base station is known to be using the frequency interval $[f_L, f_U]$, the frequency range B may be the range $[f_L - 100\text{kHz}, f_U + 100\text{kHz}]$. In some embodiments, the frequency range B may be a user-specified frequency band. In some embodiments, the receiver determines the frequency range B from a specification of the frequency interval (or the one or more GSM channels) being used by the victim base station. In one embodiment, that specification may be provided by the user through a graphical user interface.

At 120, the receiver system may operate on the restricted signal $\{x(n)\}$ to generate a plurality of baseband signals based on a corresponding sequence $\{C_j\}$ of overlapping frequency bands. The frequency bands $\{C_j\}$ are frequency intervals and may be configured so that their union covers the frequency range B. Each baseband signal $\{x_j(n)\}$ may be generated by frequency-translating the restricted signal $\{x(n)\}$ based on a center frequency of the corresponding frequency band $C_j$ and then filtering the frequency-translated signal using a lowpass filter whose bandwidth equals the bandwidth of the corresponding frequency band $C_j$.

At 125, each frequency band $C_j$ is examined to determine if it is spectrally occupied, e.g., by determining if the total power of the corresponding baseband signal $\{x_j(n)\}$ exceeds a power threshold. Spectral occupancy in a frequency band $C_j$ means that there is sufficient signal power in the frequency band $C_j$ so that the frequency band $C_j$ might possibly contain a rogue GSM transmission channel. Thus, further analysis of the corresponding baseband signal $\{x_j(n)\}$ is warranted.

At 130, each of the frequency bands $C_j$ that are spectrally-occupied is analyzed in order to classify the band $C_j$ as not containing a GSM signal, as containing a GMSK-modulated GSM signal, or as containing a PSK-modulated GSM signal. The analysis of any given one of the spectrally-occupied bands $C_j$ is based on the corresponding baseband signal $\{x_j(n)\}$. A spectrally-occupied band $C_j$ that contains a GMSK-modulated GSM signal is said to be "valid". It is possible that more than one of the spectrally-occupied bands is valid.

At 140, the baseband signal $\{x_j(n)\}$ corresponding to each valid frequency band $C_j$ (of the one or more valid frequency bands identified in operation 130) is processed to estimate and correct for carrier frequency offset. The process of estimating the carrier frequency offset may rely on a special property of GMSK modulation, to be described in detail below.

At 145, a low pass filter (LPF) is applied to the frequency-corrected baseband signal corresponding to each valid frequency band to obtain a corresponding filtered signal $\{y_j(n)\}$. The low pass filter serves to extract the GSM signal contained within the frequency-corrected baseband signal. The low pass filter may have a cutoff frequency that corresponds to the width of a GSM channel. For example, in one embodiment, the pass band of the low pass filter is 200 kHz.

At 150, the filtered signal corresponding to each valid frequency band is analyzed to determine if it the filtered signal corresponds to a GSM beacon channel. The analysis involves determining if the filtered signal includes a frequency correction burst (FCB) and/or an extended training sequence (ETS).

The remaining operations (i.e., 155, 160 and 165) may operate on the filtered signal that corresponds to the GSM beacon channel.

At 155, the receiver determines the location of the extended training sequence (ETS) within the filtered signal that corresponds to the beacon channel.

At 160, the receiver operates on the burst that contains the ETS (within the filtered signal that corresponds to the beacon channel) in order to recover data bits from that burst. The action of operating on the burst may include equalizing, demodulating and decoding the burst.

At 165, the receiver extracts information identifying the rogue GSM base station from the data bits. The identifying information may include a base station ID and/or a network ID of the rogue GSM base station.

Each of the above-described operations is discussed in detail below.

Removing the Signal from the Victim Base Station (110)

The received signal captured by the receiver includes a mixture of a signal due to the victim base station and a signal due to the rogue base station. The first step is to remove (i.e., subtract out) the signal due to the victim base station from the received signal:

Residual Signal=Received Signal−Victim Station Signal.

The signal due to the victim base station may be obtained, e.g., in one of the following two ways.

1. The receiver may be placed close to the victim base station so that the receiver has a direct line of sight to the transmit antenna(s) of the victim base station. Thus, the receiver may employ a directional antenna that is pointed at the transmit antenna of the victim base station. Alternatively, the transmitted signal of the victim base station may be provided to the receiver via a cable connection from the victim base station.

2. If the receiver cannot be placed in close proximity to the victim base station, the signal from the victim base station may be reliably demodulated, decoded and subsequently regenerated at appropriate power level for active interference cancellation. This is possible since all the relevant signal parameters for the victim base station are known a priori.

It is noted that, from the receiver's point of view, the desired signal is from the rogue base station, while the interfering signal is from the victim base station because the receiver is trying to identify the rogue base station.

Restrict the Residual Signal to a Specified Frequency Band (115)

Once the signal contribution of the victim base station has been canceled (i.e., removed), the receiver may restrict the residual signal to the specified frequency range B (or union of frequency ranges) in order to obtain a restricted signal $\{x(n)\}$, or equivalently, a restricted spectrum $X(k)$, e.g., as described above. (Index n is a time index, and index k is a frequency index.) This restriction operation may be performed in the time domain or in the frequency domain. As described above, the frequency range may be arranged to cover the one or more GSM channels over which the victim station is (or was) known to be transmitting. In some embodiments, the receiver may compute a power spectrum $P(k)$ of the restricted signal according to the relation: $P(k)=X(k)X(k)^*$, where $X(k)$ is the discrete Fourier transform of the restricted signal $x(t)$, where the superscript "*" denotes complex conjugation.

Further Limiting the Restricted Signal Based on Overlapping Bands (120)

The rogue base station may or may not be adhering to the GSM-specified plan for frequency channel allocation. This may manifest itself as carrier frequency offset. However, since we have assumed that the rogue base station is not transmitting on adjacent GSM channels (which are each 200 KHz in width), the restricted signal $\{x(n)\}$ may be further restricted to each band $C_j$ in a sequence $\{C_j\}$ of overlapping bands, e.g., as variously described above. In some embodiments, the receiver may operate on the restricted signal $\{x(n)\}$ to generate a plurality of baseband signals based on the sequence $\{C_j\}$ of overlapping bands. The frequency bands $\{C_j\}$ may be configured so that their union covers the frequency range B. Each baseband signal $\{x_j(n)\}$ may be generated by frequency-translating the restricted signal $\{x(n)\}$ based on a center frequency of the corresponding band $C_j$ and then filtering the frequency-translated signal using a lowpass filter whose bandwidth equals the bandwidth of the corresponding frequency band $C_j$.

The frequency width and the amount of frequency overlap of the bands $\{C_j\}$ are configured so that each transmitted channel of the rogue base station is completely contained in a corresponding one of the bands $C_j$. In one embodiment, each of the bands $\{C_j\}$ is 400 kHz wide, and the center frequencies of successive ones of the bands are spaced 200 kHz apart. However, a wide variety of embodiments are contemplated for the frequency width and inter-band spacing of the bands.

Check for Spectral Occupancy in Each Band (125)

Each band $C_j$ of the sequence $\{C_j\}$ of bands is checked for the presence of significant signal power, e.g., by determining if the power in the band $C_j$ is significantly higher than the noise floor of the receiver. The power in the band $C_j$ may be determined by computing the power of the corresponding baseband signal $\{x_j(n)\}$.

The receiver noise floor may be estimated, e.g., using one or more of the following mechanisms.

(A) By measuring the received power in a band which is known to be transmission free.

(B) By measuring the signal power while ensuring that the input to the receiver is blocked from receiving any transmitted signal.

(C) Offline factory calibration of the receiver.

If the power in the band $C_j$ is above the noise floor by a certain amount (e.g., a user-defined amount), the band is said to be spectrally occupied:

Power($C_j$)−NoiseFloor>PowerThreshold.

In one embodiment, the power threshold is set to be 3 dB. However, the power threshold may vary significantly, depending on how sensitive the user is to false positive decisions versus false negative decisions.

Identify Which of the Occupied Bands are Valid (130)

The next step is to examine each spectrally occupied band $C_j$ in order to classify the band $C_j$ as not containing a GSM signal, as containing a GMSK-modulated GSM signal, or as containing a PSK-modulated GSM signal. GSM follows a TDMA multiple access scheme in which information for each GSM channel is sent in the form of bursts. Each burst includes a known training sequence along with information bits. (The training sequence is defined in the 3GPP standard TS 45.002, which is hereby incorporated by reference in its entirety.) The burst is either GMSK modulated or 8-PSK modulated. The position of the training sequence in each burst, the size and the distance between two adjacent bursts are all constant and known to the receiver. Thus, the training sequences repeat at regular intervals in the transmission. These repetitions of the training sequence are used as the signature to detect if a spectrally-occupied band contains GSM or not.

1) The baseband signal $x_j(n)$ of a spectrally-occupied band $C_j$ is down-sampled to 1 sample per symbol with all possible sampling offsets. (For example, if the oversampling ratio is 8, there would be eight possible sampling offsets: 0 through 7 mod 8.) Each of the down-sampled versions is correlated with each of the 8 possible training sequences specified by the GSM standard, thus resulting in a set of 8 L correlation functions, where L is the oversampling ratio. Each of the correlation functions is analyzed to detect the presence of a periodic series of correlation peaks having period equal to the distance between bursts (1250 symbols). (Since the correlation function takes complex values, the analysis to detect the presence of the periodic series of peaks involves computing the magnitude of the correlation function.) The presence of this periodicity in at least one of the 8 L correlation functions is an indicator that the baseband signal $x_j(n)$ contains a GSM signal (i.e., a signal corresponding to one of the rogue station's GSM transmission channels.)

2) The cross correlation between the GMSK modulated version and the 8-PSK modulated version of any of the training sequences is very low. Thus, correlation of the baseband signal $x_j(n)$ with GMSK and 8-PSK modulated versions of each of the eight reference training sequences may be used to classify the spectrally-occupied band $C_j$ as being GMSK modulated or 8-PSK modulated. In other words, if the cross correlation between the baseband signal $x_j(n)$ and one of the GMSK-modulated training sequences exhibits a set of correlation peaks having sufficient magnitude and forming a periodic series with period equal to 1250 symbols, the baseband signal $x_j(n)$ is recognized as containing a GMSK-modulated GSM signal. Similarly, if the cross correlation between the baseband signal $x_j(n)$ and one of the 8PSK-modulated training sequences exhibits a set of correlation peaks having sufficient magnitude and forming a periodic series with period equal to 1250 symbols, the baseband signal $x_j(n)$ is recognized as containing an 8PSK-modulated GSM signal.

3) Furthermore, the GMSK vs. 8 PSK classification may be augmented by performing a "3 Finger GMSK Test". This test uses the fact that the magnitude spectrum of a GMSK-modulated signal (based on an IID bit sequence) passed through a fourth-power nonlinearity in the time domain gives sharp peaks at three known frequencies. Thus, to implement the test, the baseband signal $x_j(n)$ corresponding to a band $C_j$ to be classified is passed through a fourth-power nonlinearity, and the magnitude spectrum of the resultant signal $\{(x_j(n))^4\}$ is computed. This magnitude spectrum is then examined for the presence of three sharp peaks of sufficient magnitude, where the distances (in frequency) between the sharp peaks agree with expected inter-peak distances, respectively. The expected inter-peak distances may be determined based on an analysis of a magnitude spectrum of the fourth power of a reference GMSK signal, where the magnitude spectrum is computed using the same resolution bandwidth as used when analyzing the received signal (i.e., the baseband signal $x_j(n)$). The reference GMSK signal may be determined by generating an IID bit sequence and then GMSK-modulating that sequence.

GMSK vs. 8PSK discrimination based on training sequence correlation alone may occasionally fail since an 8PSK-modulated training sequence may possibly give periodic maxima (separated by 1 frame distance=1250 symbols) when correlated with a GMSK-modulated GSM signal, and vice versa. To mitigate this problem, the receiver may use an additional criterion to prevent an error in the detection of the periodic series of peaks. The peaks in the cross-correlation between any GMSK-modulated training sequence and any 8PSK-modulated training sequence are much smaller than the auto correlation peaks of the GMSK-modulated training sequence or the autocorrelation peaks of the 8PSK-modulated training sequence. Thus, after having computed the cross correlation between the baseband signal $x_j(n)$ and any given one of the modulated training sequences, the receiver may compute a certain percentile of the magnitude values of the cross correlation, and use that percentile value to threshold the peak values. In one embodiment, if the magnitude of a peak is greater than the $90^{th}$ percentile of the correlation magnitudes, it is taken into consideration for determining the presence of the periodic series of peaks. Otherwise, the peak is rejected. If the peaks that pass the percentile threshold exhibit the above-described periodicity (i.e., with period equal to one frame distance), the baseband signal $x_j(n)$ is classified as containing a GSM signal, and the modulation type is classified as either GMSK or 8PSK based on the type—GMSK or 8PSK—of the modulated training sequence used to perform the cross correlation. The receiver tests each of the 16 correlations (i.e., eight 8PSK-based correlations and eight GMSK-based correlations). The correlation that passes the periodicity-with-percentile-threshold test determines the modulation type of the baseband signal $x_j(n)$. With these parameters, in a line-of-sight environment, the GSM identification and GMSK vs. 8PSK discrimination has been verified to operate effectively down to a received power level of −88 dBm when the receiver noise floor is at −93 dBm. In a similar test setup, the 3 Finger GMSK Test operates effectively down to a signal power of −80 dBm. However, the 3 Finger GMSK Test is likely to be significantly more robust to a large carrier frequency offset present in the baseband signal $x_j(n)$.

It is noted that the $90^{th}$ percentile used as discussion above is merely one example of the threshold value. The threshold value admits a significant range of variation, depending, e.g., on the user's tolerance for false positives versus false negatives in GSM identification and/or classification of modulation type.

Note: Other signatures like the extended training sequence (ETS) and frequency correctin burst (FCB), in spite of having better auto-correlation properties compared to training sequences (TSCs), are not used in this step (i.e., step 130) because they may or may not be present in the band under examination.

Removal of Carrier Frequency Offset (140)

The above-described operation (i.e., operation 130) identifies each spectrally-occupied band that is valid (i.e., that contains a GSM channel of modulation type equal to GMSK). Given a valid band $C_j$, it is possible that the GSM channel contained in the valid band $C_j$ may be not be centrally aligned within the valid band since the rogue GSM base station does not necessarily follow the GSM standard for positioning GSM channels within the frequency spectrum. Thus, it may be necessary to estimate and compensate for carrier frequency offset.

For each valid band $C_j$, the receiver may estimate and compensate for carrier frequency offset as follows. The estimation of the carrier frequency offset may rely on the property that the magnitude spectrum of a GMSK waveform (using IID bit sequences) passed through a $4^{th}$ power nonlinearity in the time domain gives sharp peaks at three frequencies.

1. The transmitted GSM signal may include a type of burst/packet of data called the frequency correction burst (FCB). The FCB comprises 142 all-zero bits, which causes GMSK modulation to deliver an un-modulated carrier for the entire time slot. In some embodiments, the baseband signal $x_j(n)$ for a valid band $C_j$ is tested for the presence of the frequency correction burst by sliding a window through the signal samples, thereby defining a group of samples for each position of the window. The receiver calculates the bandwidth occupied by each sample group, thus obtaining a function that describes occupied bandwidth with respect to window position. The window has length equal to that of one GSM timeslot. The presence of a frequency correction burst is indicated by a considerable dip in the occupied bandwidth. The receiver deletes samples at positions that correspond to low occupied bandwidth (i.e., occupied bandwidth less than a threshold value), thereby forming a contracted signal. "Deletion" of a sample means removing it from the sample sequence.

2. For estimation of carrier frequency offset, the magnitude spectrum of the contracted signal and the magnitude of a reference spectrum P(k) are correlated for all possible cyclic shifts. The shift at which the cross-correlation achieves its maximum defines the value of the carrier frequency offset:

$$\hat{f}_0 = \frac{F_S}{N_{p1}L} \underset{m}{\mathrm{argmax}} \left[ \sum_{k=0}^{N_{p1}L-1} |R((k+m)_{N_{p1}L})||P(k)| \right],$$

or equivalently, $$\hat{f}_0 = \frac{F_S}{N_{p1}L} \underset{m}{\mathrm{argmax}} \left[ \sum_{k=0}^{N_{p1}L-1} |R(k)||P((k-m)_{N_{p1}L})| \right].$$

The parameter $N_{p1}=N_{p1}$ is the number of symbols in the contracted signal. Frequency $F_3=F_S$ is the sampling frequency at the analog-to-digital (A/D) converter at the receiver front end. The spectrum R(k) is R(k)=the $(N_{p1}L)$-point DFT of the first $(N_{p1}L)$ $(N_{p1}L)$ samples of the contracted signal, where L is the oversampling ratio. Reference spectrum P(k) =$(N_{p1}L)P(k)$ is the $(N_{p1}L)$-point DFT of a reference GMSK signal.

The baseband signal $x_j(n)$ is then compensated for the estimated carrier frequency offset to obtain a corresponding frequency-corrected signal $z_j(n)$:

$$z_j(n) = x_j(n)\exp\left(-j2\pi\frac{\hat{f}_0}{F_S}n\right).$$

As the estimation is done using a correlation between a circularly-shifted magnitude spectrum of the channel signal and a locally-generated reference GMSK spectrum, the error in estimation is an increasing function of the carrier frequency offset. Therefore, the above-described processes for estimation and compensation of carrier frequency offset may be repeated one or more times to drive the carrier frequency offset to zero.

Note: The accuracy of the above-described, process for estimation of carrier frequency offset may be limited by the resolution bandwidth of the DFT. (The resolution bandwidth of a DFT is the difference in frequency between adjacent frequency bins of the DFT.) Thus, larger values of the product $N_{p1}L$ allow for improved estimation accuracy.

Low Pass Filtering (145)

The frequency-corrected signal $z_j(n)$ corresponding to each valid band may be subjected to a low pass filtering operation to extract the GSM signal contained in the frequency-corrected signal. As described above, the pass band of the low pass filter may be configured to agree with the frequency width of a standard GSM channel. For example, the pass band may be 200 KHz in width.

Search for FCB and ETS in Each Valid Band (150)

In some embodiments, the receiver may examine the filtered signal (i.e., the extracted GSM signal) corresponding to each valid band $C_j$ to determine if that filtered signal corresponds to a GSM beacon channel. To that end, the receiver may acquire at least 13 frames of filtered signal in order to guarantee the occurrence of at least one ETS (extended training sequence) and FCB (frequency correction burst). In one embodiment, the value of the oversampling factor L is set to 16 (or more) to facilitate a precise determination of the start location of the ETS.

Once the specified number of frames is acquired, the acquired samples are normalized to have a mean power of 1 and then searched for the presence of the ETS. This search may be performed by correlating with a reference ETS using a moving window of length 64*L (since the ETS is 64 symbols long). The reference ETS is known to the receiver, being defined by the GSM standard.

The ETS has excellent auto-correlation properties, and thus, gives a high distinguishable peak at its exact location. This correlation peak is used to identify the presence of the ETS and its location in the filtered signal.

The same search algorithm may be used for finding the FCB. A 148*L-sized moving window is used to correlate the filtered signal with a reference FCB. A sharp peak pinpoints the location of the FCB.

The beacon channel (i.e., the broadcast control channel) would contain both the ETS as well as the FCB separated by a fixed interval. Hence the criteria for identifying the filtered signal as a beacon channel are:

1. Peaks on correlating the acquired signal with each of the ETS and the FCB.
2. 1 frame distance (1250 symbol duration) between the correlation peaks of the ETS and the FCB.

If the filtered signal satisfies the above criteria, the filtered signal is recognized as corresponding to a beacon channel. The beacon channel contains all the broadcast-related controls sent by the rogue base station. Interception of these controls can lead to the identification of the rogue base station. The filtered signal that corresponds to the beacon channel is referred to as the beacon signal.

Frame Synchronization: Pinpointing the ETS (155)

The knowledge of the correct locations of the signaling controls in the rogue station transmissions is essential for its identification. Correct frame synchronization can be achieved using the above-computed correlation function between the ETS and the beacon signal. The ETS has an excellent correlation property, giving a very prominent peak in the ETS correlation function. Thus, the point where the ETS correlation function has its maximum may be used to define the location of the ETS in the beacon signal. This location is then used to extract the complete synchronization burst from the beacon signal. The synchronization burst is subsequently equalized, demodulated and decoded to extract the base station color code (BCC) and the network color code (NCC) of the rogue GSM base station.

In some embodiments, the method of FIGS. 1A and 1B may operate offline on a signal that has been previously captured and stored.

In some embodiments, the method of FIGS. 1A and 1B may be configured for real-time processing of live signals.

Figure 2:
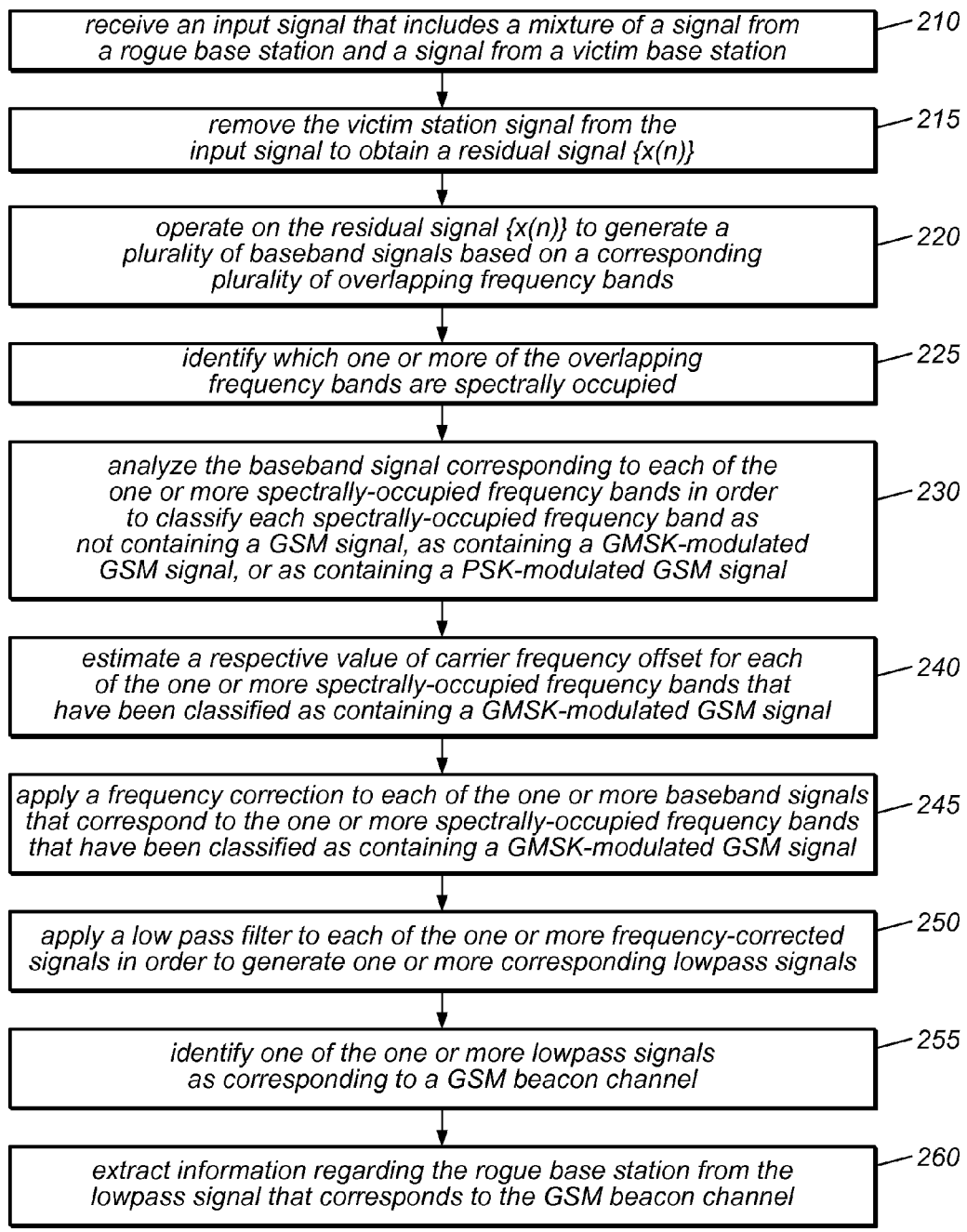
FIG. 2 illustrates another embodiment of the method for identifying a rogue GSM base station by intercepting its downlink beacon channel.

In one set of embodiments, a method for identifying a rogue GSM base station may involve the processing operations shown in FIG. 2. The method may be performed by a computer system that is coupled to (or incorporated within) a receiver.

At 210, a computer system may receive an input signal that includes a mixture of a signal from a rogue base station and a signal from a victim base station. The input signal is a discrete-time signal captured by an analog-to-digital converter of a receiver that is coupled to the computer system.

At 215, the computer system may remove the victim station signal from the input signal to obtain a residual signal $\{x(n)\}$. This involves estimating the victim station signal (e.g., as variously described above), and subtracting the estimated victim station signal from the input signal. The residual signal $\{x(n)\}$ is the result of the subtraction.

At 220, the computer system may operate on the residual signal $\{x(n)\}$ to generate a plurality of baseband signals based on a corresponding plurality of overlapping frequency bands. Each of the baseband signals may be generated by frequency-translating the residual signal $\{x(n)\}$ based on a center frequency of the corresponding frequency band and then low-pass filtering the frequency-translated residual signal. The low-pass filtering of the frequency-translated residual signal may be performed with a low-pass filter whose frequency width equals the bandwidth of the corresponding frequency band. (In preferred embodiments, each of the overlapping frequency bands has the same bandwidth. Thus, the same low-pass filter may be used to generate each of the baseband signals.) The width, spacing and number of the overlapping frequency bands may be chosen so that any interfering GSM channel generated by the rogue base station will fit entirely into at least one of the frequency bands. For example, in one embodiment, the width of each frequency band is 400 kHz; and the center frequencies of successive ones of the frequency bands may be spaced 200 kHz apart. However, a wide variety of other values are possible for the bandwidth parameter and the center-frequency spacing.

Prior to generating the plurality of baseband signals, the computer system may perform a preliminary restriction of the residual signal to a frequency range B that covers the extent of the victim's GSM channels. This step serves to eliminate from further consideration any rogue GSM channel that cannot possibly interfere with any of the victim's GSM channels. Thus, operation 220 may operate on the residual signal after it has been subjected to this preliminary restriction.

At 225, the computer system may identify which one or more of the overlapping frequency bands are spectrally occupied, e.g., based on a comparison of power within each frequency band to a noise floor. If the power within a given frequency band exceeds the noise floor at least by a minimum amount (i.e., the power minus the noise floor is greater than the minimum amount), the given frequency band is said to be spectrally occupied. The power within the given frequency band is determined based on the baseband signal that corresponds to the given frequency band, e.g., by computing an average power of the samples in that baseband signal. The noise floor may be estimated, e.g., by any of the methods described above.

At 230, the computer system may analyze the baseband signal corresponding to each of the one or more spectrally-occupied frequency bands in order to classify each spectrally-occupied frequency band as not containing a GSM signal, as containing a GMSK-modulated GSM signal, or as containing a PSK-modulated GSM signal. The analysis may be conducted as variously described above.

According to the GSM standard, GSM beacon channels are GMSK modulated. Thus, the beacon channel of the rogue station will reside within one of the one or more spectrally-occupied frequency bands that have been classified as containing a GMSK-modulated GSM signal.

At 240, the computer system may estimate a respective value of carrier frequency offset for each of the one or more spectrally-occupied frequency bands that have been classified as containing a GMSK-modulated GSM signal. The carrier frequency offset for each of those frequency bands is computed based on the corresponding baseband signal, e.g., as variously described above.

At 245, the computer system may apply a frequency correction to each of the one or more baseband signals that correspond to the one or more spectrally-occupied frequency bands that have been classified as containing a GMSK-modulated GSM signal. The frequency correction that is applied to each of those baseband signals is based on the corresponding estimated value of carrier frequency offset. The action of applying the frequency correction to each baseband signal compensates for corresponding carrier frequency offset. (The frequency correction may be applied by multiplying the baseband signal by a complex sinusoid whose frequency is equal to the negative of the estimated value.)

At 250, the computer system may apply a low pass filter to each of the one or more frequency-corrected signals in order to generate one or more corresponding lowpass signals. In one embodiment, the low pass filter may be configured with a cutoff frequency of approximately 100 kHz in order to pass the GSM signal within the frequency-corrected signal and to reject any signal energy outside the band [−100 kHz, 100 kHz]. In some embodiments, the application of the low pass filter may be omitted.

At 255, the computer system identifies one of the one or more lowpass signals as corresponding to a GSM beacon channel by determining which of the one or more lowpass signals includes an extended training sequence and a frequency correction burst. The extended training sequence (ETS) and frequency correction burst (FCB) are known sequences (being defined by the GSM standard). The action of determining which of the one or more lowpass signals includes the ETS and the FCB may include correlating each lowpass signal with the ETS and with the FCB and then searching for peaks of sufficient amplitude in the resulting correlation functions.

At 260, the computer system may extract information regarding the rogue base station from the lowpass signal that corresponds to the GSM beacon channel. In some embodiments, the extracted information includes a base station color code of the rogue base station and/or a network color code of the rogue base station.

The extracted information may be displayed via a display device. In some embodiments, the extracted information may be displayed along with other information such as the center frequency of the rogue GSM channel (prior to down conversion), the power associated with the rogue GSM channel, the location or bearing angle of the rogue GSM base station, etc.

The process of extracting the information regarding the rogue base station from the frequency corrected signal that corresponds to the GSM beacon channel may include: extracting a synchronization burst from that signal; and performing equalization, demodulation and decoding on the synchronization burst.

In some embodiments, the process of analyzing the baseband signal corresponding to each of the one or more spectrally-occupied frequency bands may include: computing correlations between downsampled versions of the baseband signal and each of a plurality of templates, where the templates include GMSK and 8-PSK modulated versions of a set of GSM training sequences; and determining whether one of the correlations includes a periodic series of peaks having magnitude greater than a computed threshold and having interpeak distance corresponding to a known constant value. In response to determining that one of the correlations includes the periodic series of peaks, the computer system may classify the baseband signal as being GMSK modulated or 8-PSK modulated based on whether the template that gives the correlation including the periodic series of peaks is GMSK modulated or 8-PSK modulated.

In some embodiments, the templates may be ordered so that a simple test on the template index may be performed to determine if any given template is a GMSK template or an 8-PSK template.

In some embodiments, the process of analyzing the baseband signal may also include: computing a magnitude spectrum of a fourth power of the baseband signal; and determining whether the magnitude spectrum includes three peaks that have magnitude larger than a second threshold and that conform to a predetermined pattern of interpeak distances, e.g., as variously described above.

In some embodiments, the process of estimating the respective value of the carrier frequency offset for each spectrally-occupied frequency band includes removing frequency correction bursts from the corresponding baseband signal. The frequency correction bursts may be removed from the baseband signal by (a) computing an occupied bandwidth of the baseband signal in each of a sliding series of windows that cover the baseband signal, and (b) discarding portions of the baseband signal that correspond to a subset of the windows having occupied bandwidth lower than a threshold.

In some embodiments, the process of estimating the respective value of the carrier frequency offset for each spectrally-occupied frequency band includes maximizing a cyclic correlation between a magnitude spectrum of the corresponding baseband signal and a magnitude spectrum of a reference GMSK signal, e.g., as variously described above.

In some embodiment, the method of FIG. 2 may also include applying a low pass filter to each of the one or more frequency corrected signals prior to operation 250 (i.e., said applying the low pass filter).

In one set of embodiments, a method for identifying a rogue base station may include: operating on a signal {x(n)} to generate a plurality of baseband signals based on a corresponding plurality of overlapping frequency bands, wherein each of the baseband signals is generated by frequency-translating the signal {x(n)} based on a center frequency of the corresponding frequency band and by low-pass filtering the frequency-translated signal; identifying which one or more of the overlapping frequency bands are spectrally occupied; analyzing the baseband signal corresponding to each of the one or more spectrally-occupied frequency bands in order to classify the spectrally-occupied frequency band as not containing a GSM signal, as containing a GMSK-modulated GSM signal, or as containing a PSK-modulated GSM signal; applying a frequency correction to each of the one or more baseband signals that correspond to the one or more spectrally-occupied frequency bands that have been classified as containing a GMSK-modulated GSM signal in order to obtain one or more corresponding frequency corrected signals; and identifying one of the one or more frequency corrected signals as corresponding to a GSM beacon channel by determining which of the one or more frequency corrected signals includes a known extended training sequence and a known frequency correction burst.

Figure 3:
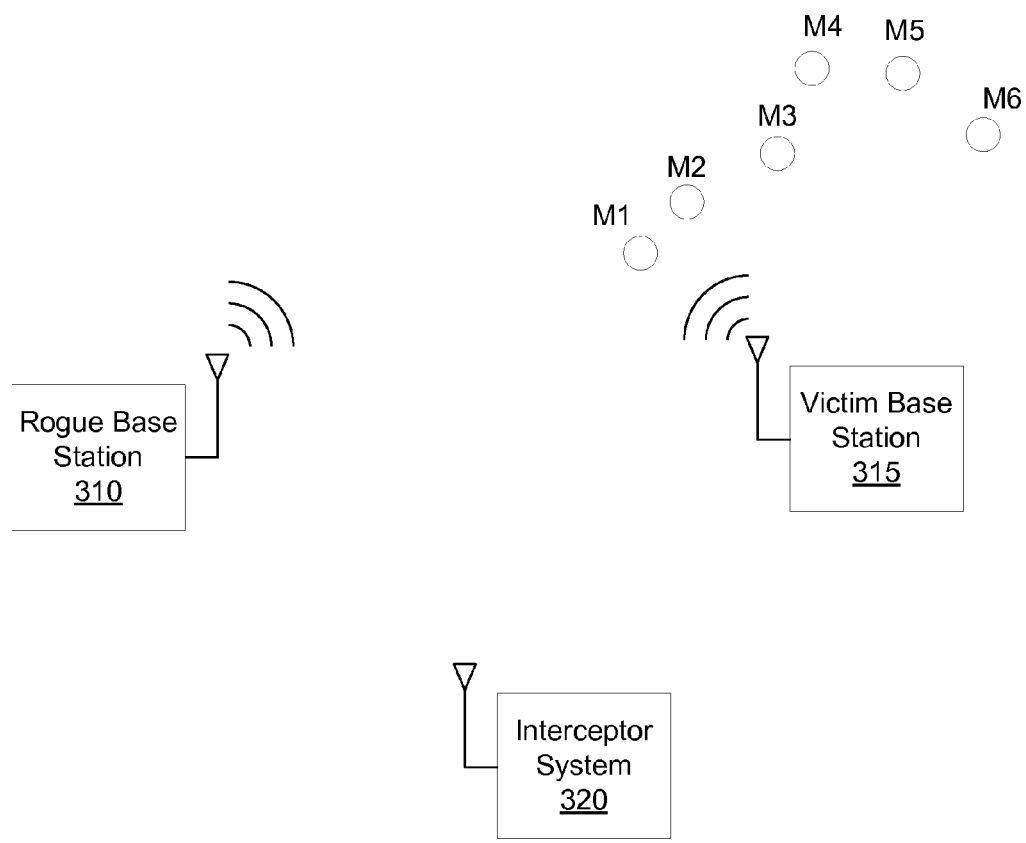
FIG. 3 is a conceptual diagram showing a victim base station, a rogue base station and a set of mobile units.

FIG. 3 is a conceptual diagram according to one embodiment of the present invention. In this embodiment, a rogue base station 310 transmits and receives signals via the atmosphere; a victim base station 315 also transmits and receives signals via the atmosphere. When the rogue station's transmissions overlap in the frequency spectrum with the victim station's transmissions, mobile units M1 through M6 within the vicinity of the victim base station 315 will have difficulty receiving and decoding the victim station's transmissions.

(The six mobile units shown in the figure is meant to be representative. Any number of mobile units may be present.) A signal interceptor system 320 receives signals from the atmosphere and operates according to any of the various method embodiments described herein in order to extract information that identifies the rogue station 310.

Figure 4B:
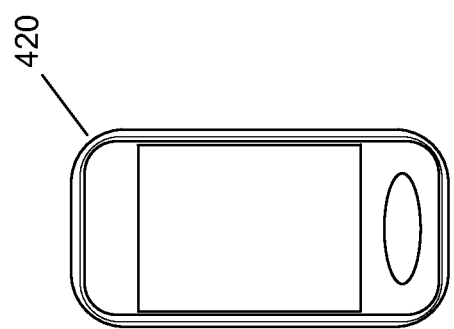
FIGS. 4A and 4B illustrate hand-held embodiments of the signal interceptor system of FIG. 3.
Figure 4A:
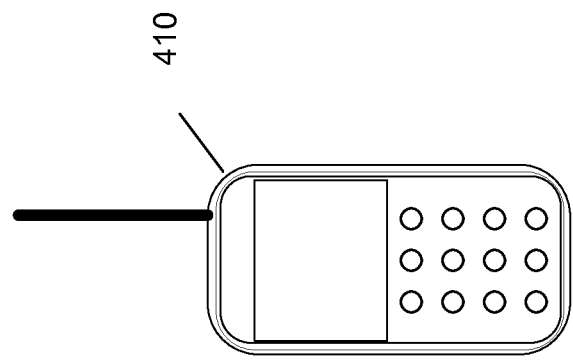

FIGS. 4A and 4B illustrate hand-held mobile embodiments 410 and 420 of the signal interceptor system 320. A hand-held mobile device may be augmented with a direction finding system in order to detect the direction of the signals being transmitted by the rogue base station.

Figure 5:
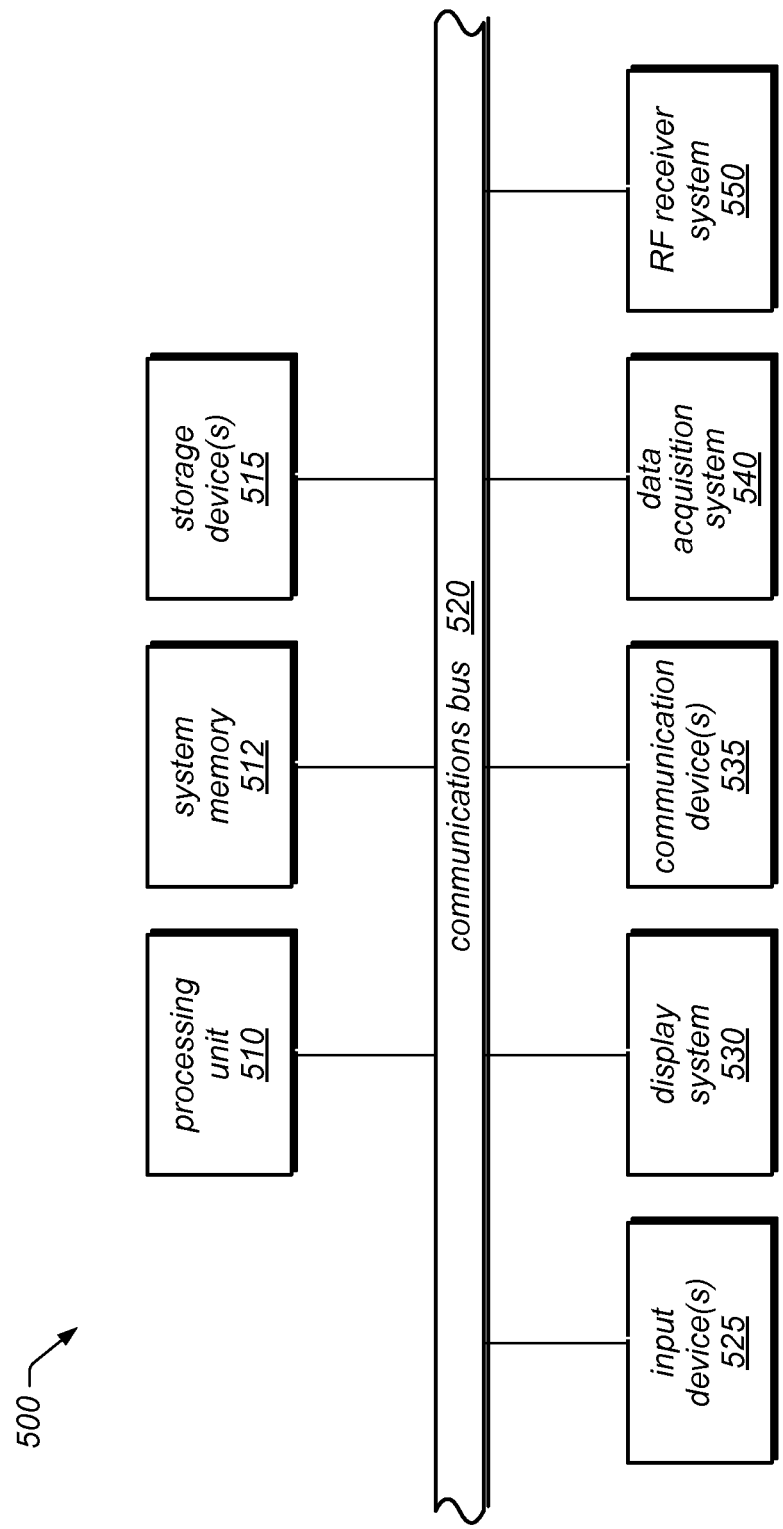
FIG. 5 illustrates one embodiment of a computer system may be used to perform any of the method embodiments described herein.

FIG. 5 illustrates one embodiment of a computer system 500 that may be used to perform any of the method embodiments described herein, or, any combination of the method embodiments described herein, or any subset of any of the method embodiments described herein, or, any combination of such subsets.

Computer system 500 may include a processing unit 510, a system memory 512, a set 515 of one or more storage devices, a communication bus 520, a set 525 of input devices, and a display system 530.

System memory 512 may include a set of semiconductor devices such as RAM devices (and perhaps also a set of ROM devices).

Storage devices 515 may include any of various storage devices such as one or more memory media and/or memory access devices. For example, storage devices 515 may include devices such as a CD/DVD-ROM drive, a hard disk, a magnetic disk drive, magnetic tape drives, etc.

Processing unit 510 is configured to read and execute program instructions, e.g., program instructions stored in system memory 512 and/or on one or more of the storage devices 515. Processing unit 510 may couple to system memory 512 through communication bus 520 (or through a system of interconnected busses). The program instructions configure the computer system 500 to implement a method, e.g., any of the method embodiments described herein, or, any combination of the method embodiments described herein, or, any subset of any of the method embodiments described herein, or any combination of such subsets.

Processing unit 510 may include one or more processors (e.g., microprocessors).

One or more users may supply input to the computer system 500 through the input devices 525. Input devices 525 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 530 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 500 may include other devices, e.g., devices such as one or more graphics accelerators, one or more speakers, a sound card, a video camera and a video card.

In some embodiments, computer system 500 may include one or more communication devices 535, e.g., a network interface card for interfacing with a computer network. In one embodiment, computer system 500 may receive an input signal and perform signal processing operations on the modulated signal using such a communication device.

In some embodiments, the communication devices may include a reconfigurable I/O (RIO) board that includes one or more programmable hardware elements (PHEs), one or more A/D converters and additional circuitry. The RIO board is programmable to achieve a user-desired configuration of input and/or output processing, e.g., via a program written using LabVIEW FPGA. In some embodiments, the additional circuitry of the RIO board may include circuitry optimized for various kinds of signal processing operations and/or circuitry configured for signal amplification, carrier signal generation and synchronization, clock signal generation and synchronization, RF down-conversion, any of various kinds of demodulation, etc. The RIO board may receive an input signal, down-convert the input signal to baseband, digitize the baseband signal, and make the digitized baseband samples available to the computer system 500 for further processing, e.g., processing according to any of the method embodiments disclosed herein.

In some embodiments, the reconfigurable I/O board is one of the RIO boards provided by National Instrument Corporation.

The computer system may be configured with a software infrastructure including an operating system, and perhaps also, one or more graphics APIs (such as OpenGL®, Direct3D, Java 3D™). In some embodiments, the software infrastructure may include LabVIEW and/or LabVIEW FPGA, which are software products of National Instruments Corporation.

In some embodiments, the computer system 500 may be configured for coupling to a data acquisition system 540. The data acquisition system 540 is configured to receive analog inputs signals, to digitize the analog input signals, and to make those digitized signals available to the computer system 500. The data acquisition system 540 may operate under the control of the software executing on processor 510.

In some embodiments, the computer system 500 may be configured to interface with a receiver system 550, e.g., an off-the-shelf receiver system designed for capturing radiated electromagnetic signals (such as RF signals, wireless LAN signals, etc.), down-converting the captured signals, and sampling the down-converted signals. In one embodiment, the receiver system 550 may be realized by a vector signal analyzer such as the NI PXIe-5663 or the NI PXIe-5663E provided by National Instruments Corporation.

Figure 6:
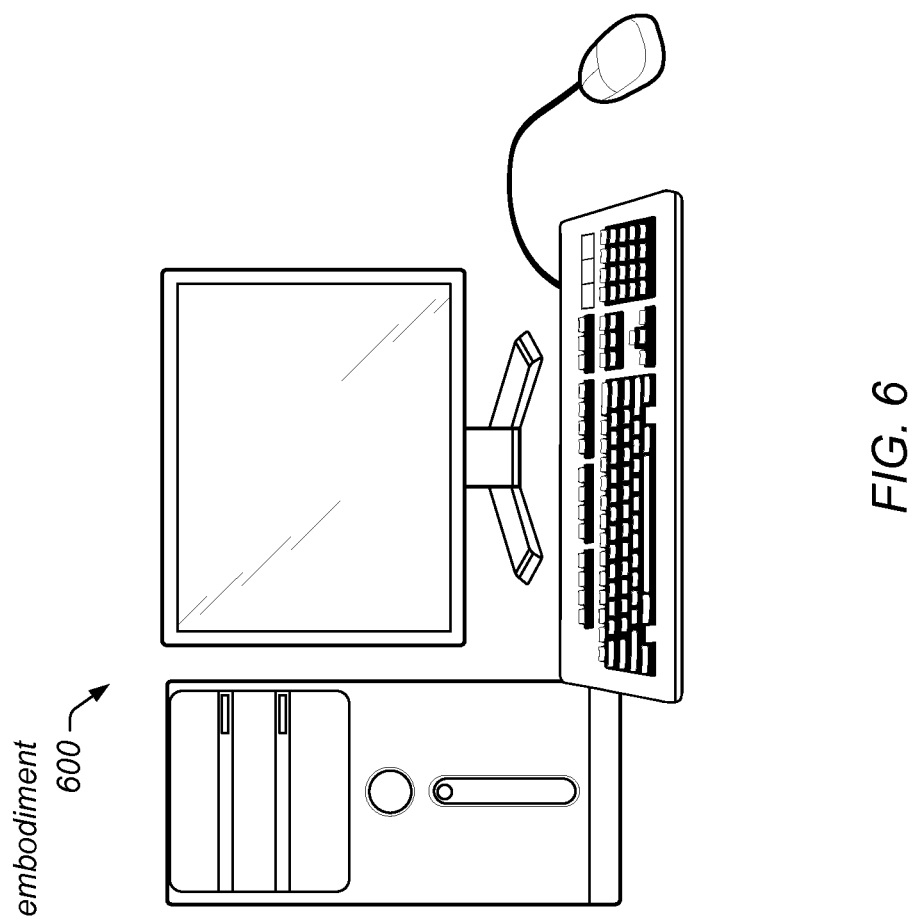
FIG. 6 illustrates one embodiment of the computer system 500 shown in FIG. 5.

FIG. 6 illustrates one possible embodiment 600 for computer system 500.

The following numbered paragraphs describe additional embodiments of the present invention.

1. A method comprising:
receiving an input signal including a mixture of a first signal from a rogue base station and a second signal from a victim base station;
removing the second signal from the input signal to obtain a residual signal $\{x(n)\}$;
restricting the residual signal to each of a plurality of overlapping frequency channels to obtain corresponding restricted signals;
identifying a first of the overlapping frequency channels as being spectrally occupied based on a comparison of power within the first frequency channel to a noise floor, wherein the power within the first frequency channel is determined from the restricted signal $\{r_0(n)\}$ that corresponds to the first frequency channel;
computing correlations between downsampled versions of the restricted signal $\{r_0(n)\}$ and each of a plurality of templates, wherein the templates include GMSK and 8PSK modulated versions of a set of possible GSM training sequences;
identifying the restricted signal $\{r_0(n)\}$ as being a GSM signal based on a determination that one of the correlations includes a periodic series of peaks with interpeak distance corresponding to a known constant value;
identifying a type of modulation of the restricted signal $\{r_0(n)\}$ as being GMSK or 8PSK based on an index of the template corresponding to the correlation that includes the periodic series of peaks;
computing an occupied bandwidth of the restricted signal $\{r_0(n)\}$ in each of a series of windows that cover the restricted signal $\{r_0(n)\}$;
discarding portions of the restricted signal $\{r_0(n)\}$ that correspond to a subset of the windows having occupied bandwidth lower than a first threshold, wherein said discarding produces a signal $\{r_1(n)\}$;
computing an estimate for a carrier frequency offset by maximizing a cyclic correlation between a magnitude spectrum of the signal $\{r_1(n)\}$ and a magnitude spectrum of a reference GMSK signal;
applying a frequency correction to the signal $\{r_1(n)\}$ based on the estimate for the carrier frequency offset in order to generate a signal $\{r_2(n)\}$;
applying a low pass filter to the signal $\{r_2(n)\}$ to generate a signal $\{r_3(n)\}$;
identifying the signal $\{r_3(n)\}$ as corresponding to a GSM beacon channel based on results of a correlation analysis indicating that the signal $\{r_3(n)\}$ includes an extended training sequence and a frequency correction burst;
extracting information regarding the rogue base station from the signal $\{r_3(n)\}$.

2. The method of paragraph 1 further comprising: prior to said applying a low pass filter, repeating said computing an estimate for the carrier frequency offset and said applying a frequency correction.

3. The method of paragraph 1, wherein said extracted information includes a base station color code and a network color code of the rogue base station.

4. The method of paragraph 1 further comprising: displaying the extracted information via a display device. Other data may be displayed as well, e.g., data such as: an indicator that the first signal is a GSM signal; the modulation type; a plot of the constellation; etc.

5. The method of paragraph 1, wherein said extracting the information includes extracting a synchronization burst from the signal $\{r_3(n)\}$ and performing equalization, demodulation and decoding on the synchronization burst.

6. A method comprising:
computing correlations between downsampled versions of a signal $\{r_0(n)\}$ and each of a plurality of templates, wherein the templates include GMSK and 8PSK modulated versions of a set of possible GSM training sequences, wherein the signal $\{r_0(n)\}$ corresponds to a transmission from a base station;
identifying the signal $\{r_0(n)\}$ as being a GSM signal based on a determination that one of the correlations includes a periodic series of peaks with interpeak distance corresponding to a known constant value;
identifying a type of modulation of the signal $\{r_0(n)\}$ as being GMSK or 8PSK based on an index of the template corresponding to the correlation that includes the periodic series of peaks;
computing an occupied bandwidth of the signal $\{r_0(n)\}$ in each of a series of windows that cover the signal $\{r_0(n)\}$;

discarding portions of the signal $\{r_0(n)\}$ that correspond to a subset of the windows having occupied bandwidth lower than a first threshold, wherein said discarding produces a signal $\{r_1(n)\}$;

computing an estimate for a carrier frequency offset by locating a maximum of a cyclic correlation between a magnitude spectrum of the signal $\{r_1(n)\}$ and a magnitude spectrum of a reference GMSK signal;

applying a frequency correction to the signal $\{r_1(n)\}$ based on the estimate for the carrier frequency offset in order to generate a signal $\{r_2(n)\}$.

7. The method of paragraph 6 further comprising: demodulating the signal $\{r_2(n)\}$ to recover information bits based on the identified modulation type.

8. The method of paragraph 7 further comprising: driving an output device such as a speaker, a display, etc. based on the information bits.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method comprising:

utilizing a computer system to perform a plurality of operations including:

operating on a signal $\{x(n)\}$ to generate a plurality of baseband signals based on a corresponding plurality of overlapping frequency bands having distinct center frequencies, wherein each of the baseband signals is generated by frequency-translating the signal $\{x(n)\}$ based on a center frequency of the corresponding frequency band to obtain a corresponding frequency-translated signal and by low-pass filtering the corresponding frequency-translated signal;

identifying which one or more of the overlapping frequency bands are spectrally occupied;

analyzing the baseband signal corresponding to each of the one or more spectrally-occupied frequency bands in order to classify the spectrally-occupied frequency band as not containing a GSM signal, as containing a GMSK-modulated GSM signal, or as containing a PSK-modulated GSM signal;

estimating a respective value of carrier frequency offset for each of the one or more spectrally-occupied frequency bands that have been classified as containing a GMSK-modulated GSM signal, based on the corresponding baseband signal;

applying a frequency correction to each of the one or more baseband signals that correspond to the one or more spectrally-occupied frequency bands that have been classified as containing a GMSK-modulated GSM signal, based on the corresponding respective estimated value of carrier frequency offset; and identifying one of the one or more frequency corrected signals as corresponding to a GSM beacon channel by determining which of the one or more frequency corrected signals includes a known extended training sequence and a known frequency correction burst.

2. The method of claim 1, wherein the plurality of operations also include computing the signal $\{x(n)\}$, wherein said computing includes:

receiving an input signal that includes a mixture of the first signal transmitted by a rogue base station and a second signal from a victim base station; and removing the second signal from the input signal to obtain the signal $\{x(n)\}$.

3. The method of claim 1, wherein the plurality of operations also include:

extracting information regarding a rogue base station from the frequency corrected signal that corresponds to the GSM beacon channel.

4. The method of claim 3, wherein said extracted information includes a base station color code and a network color code of the rogue base station.

5. The method of claim 3, wherein the plurality of operations also include:

displaying the extracted information via a display device.

6. The method of claim 3, wherein said extracting the information includes:

extracting a synchronization burst from the frequency corrected signal that corresponds to the GSM beacon channel; and performing equalization, demodulation and decoding on the synchronization burst.

7. The method of claim 1, wherein said analyzing the baseband signal corresponding to each of the one or more spectrally-occupied frequency bands includes:

computing correlations between downsampled versions of the baseband signal and each of a plurality of templates, wherein the templates include GMSK and 8-PSK modulated versions of a set of GSM training sequences;

determining whether one of the correlations includes a periodic series of peaks having magnitude greater than a first threshold and having interpeak distance corresponding to a known constant value.

8. The method of claim 7, wherein said analyzing the baseband signal also includes:

in response to determining that one of the correlations includes the periodic series of peaks, classifying the baseband signal as being GMSK modulated or 8-PSK modulated based on whether the template that gives the correlation including the periodic series of peaks is GMSK modulated or 8-PSK modulated.

9. The method of claim 7, wherein said analyzing the baseband signal also includes:

computing a magnitude spectrum of a fourth power of the baseband signal;

determining whether the magnitude spectrum includes three peaks that have magnitude larger than a second threshold and that conform to a predetermined pattern of interpeak distances.

10. The method of claim 1, wherein said estimating the respective value of the carrier frequency offset for each spectrally-occupied frequency band includes:

removing frequency correction bursts from the corresponding baseband signal by (a) computing an occupied bandwidth of the baseband signal in each of a sliding series of windows that cover the baseband signal, and (b) discarding portions of the baseband signal that correspond to a subset of the windows having occupied bandwidth lower than a threshold.

11. The method of claim 1, wherein said estimating the respective value of the carrier frequency offset for each spectrally-occupied frequency band includes:

maximizing a cyclic correlation between a magnitude spectrum of the corresponding baseband signal and a magnitude spectrum of a reference GMSK signal.

12. The method of claim 1, wherein the plurality of operations also include:

applying a low pass filter to each of the one or more frequency corrected signals prior to said identifying one of the one or more frequency corrected signals as corresponding to a GSM beacon channel.

13. A non-transitory computer-readable memory medium storing program instructions, wherein the program instructions, when executed by a computer system, cause the computer system to: operate on a signal $\{x(n)\}$ to generate a plurality of baseband signals based on a corresponding plurality of overlapping frequency bands having distinct center frequencies, wherein each of the baseband signals is generated by frequency-translating the signal $\{x(n)\}$ based on a center frequency of the corresponding frequency band to obtain a corresponding frequency-translated signal and by low-pass filtering the corresponding frequency-translated signal;
- identify which one or more of the overlapping frequency bands are spectrally occupied;
- analyze the baseband signal corresponding to each of the one or more spectrally-occupied frequency bands in order to classify the spectrally-occupied frequency band as not containing a GSM signal, as containing a GMSK-modulated GSM signal, or as containing a PSK-modulated GSM signal;
- estimate a respective value of carrier frequency offset for each of the one or more spectrally-occupied frequency bands that have been classified as containing a GMSK-modulated GSM signal, based on the corresponding baseband signal;
- apply a frequency correction to each of the one or more baseband signals that correspond to the one or more spectrally-occupied frequency bands that have been classified as containing a GMSK-modulated GSM signal, based on the corresponding respective estimated value of carrier frequency offset; and
- identify one of the one or more frequency corrected signals as corresponding to a GSM beacon channel by determining which of the one or more frequency corrected signals includes a known extended training sequence and a known frequency correction burst.

14. The memory medium of claim 13, wherein the program instructions, when executed by the computer system, further cause the computer system to compute the signal $\{x(n)\}$, wherein said computing includes:
- receiving an input signal that includes a mixture of the first signal transmitted by a rogue base station and a second signal from a victim base station; and
- removing the second signal from the input signal to obtain the signal $\{x(n)\}$.

15. The memory medium of claim 13, wherein the program instructions, when executed by the computer system, further cause the computer system to:
- extract information regarding a rogue base station from the frequency corrected signal that corresponds to the GSM beacon channel.

16. The memory medium of claim 15, wherein said extracted information includes a base station color code and a network color code of the rogue base station.

17. The memory medium of claim 15, wherein said extracting the information includes:
- extracting a synchronization burst from the frequency corrected signal that corresponds to the GSM beacon channel; and
- performing equalization, demodulation and decoding on the synchronization burst.

18. A computer system comprising:
a processor; and
memory that stores program instructions, wherein the program instructions, when executed by the processor, cause the processor to:
operate on a signal $\{x(n)\}$ to generate a plurality of baseband signals based on a corresponding plurality of overlapping frequency bands having distinct center frequencies, wherein each of the baseband signals is generated by frequency-translating the signal $\{x(n)\}$ based on a center frequency of the corresponding frequency band to obtain a corresponding frequency-translated signal and by low-pass filtering the corresponding frequency-translated signal;
identify which one or more of the overlapping frequency bands are spectrally occupied;
analyze the baseband signal corresponding to each of the one or more spectrally-occupied frequency bands in order to classify the spectrally-occupied frequency band as not containing a GSM signal, as containing a GMSK-modulated GSM signal, or as containing a PSK-modulated GSM signal;
estimate a respective value of carrier frequency offset for each of the one or more spectrally-occupied frequency bands that have been classified as containing a GMSK-modulated GSM signal, based on the corresponding baseband signal;
apply a frequency correction to each of the one or more baseband signals that correspond to the one or more spectrally-occupied frequency bands that have been classified as containing a GMSK-modulated GSM signal, based on the corresponding respective estimated value of carrier frequency offset; and
identify one of the one or more frequency corrected signals as corresponding to a GSM beacon channel by determining which of the one or more frequency corrected signals includes a known extended training sequence and a known frequency correction burst.

19. The computer system of claim 18, wherein the program instructions, when executed by the processor, further cause the processor to:
- extract information regarding a rogue base station from the frequency corrected signal that corresponds to the GSM beacon channel.

20. The computer system of claim 18, wherein the program instructions, when executed by the processor, further cause the processor to compute the signal $\{x(n)\}$, wherein said computing includes:
- receiving an input signal that includes a mixture of the first signal transmitted by a rogue base station and a second signal from a victim base station; and
- removing the second signal from the input signal to obtain the signal $\{x(n)\}$.

* * * * *